Oct. 5, 1926. 1,602,045
J. G. RECORD
COOKING OVEN
Filed July 10, 1926
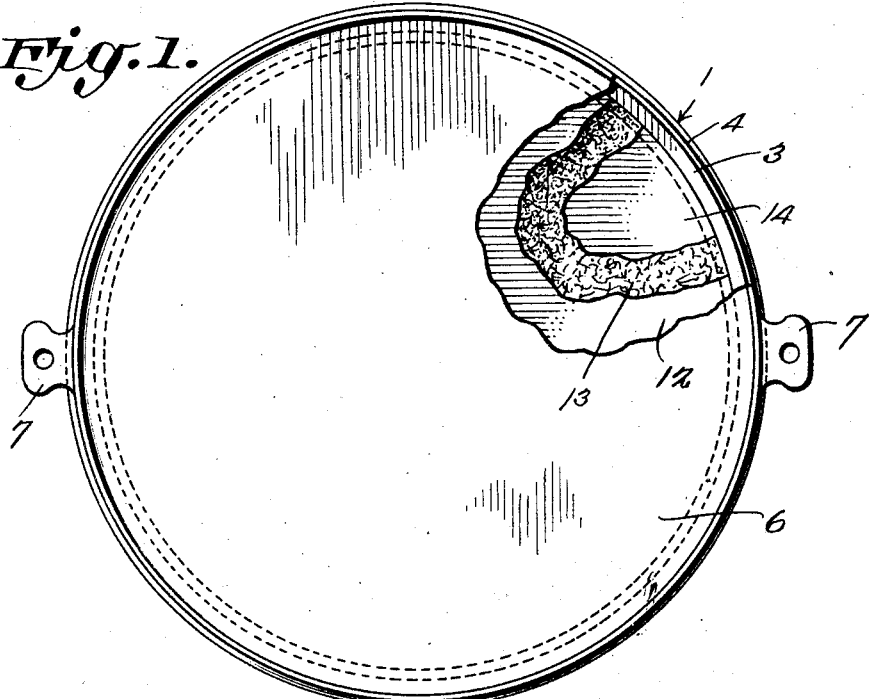
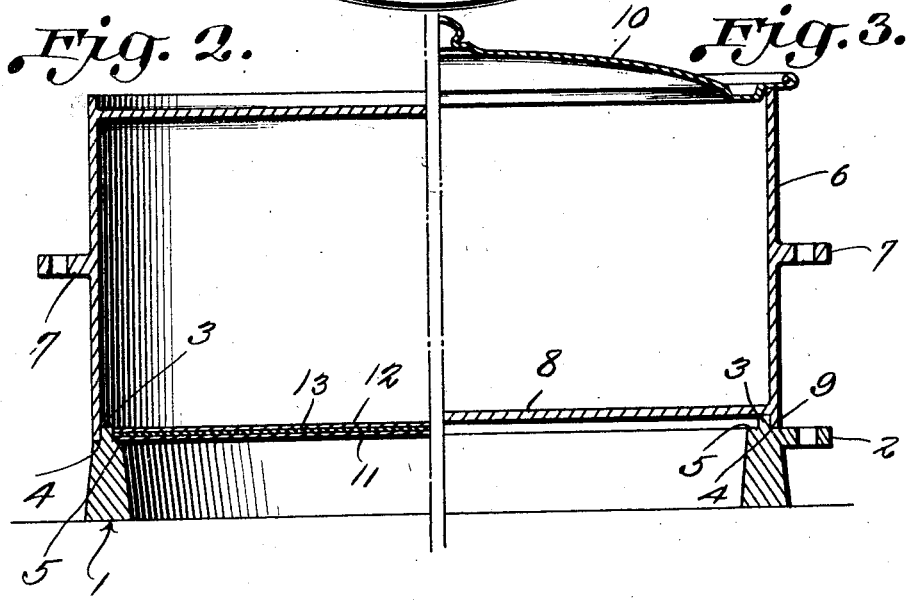
J. G. Record
Inventor Patented Oct. 5, 1926.

1,602,045

UNITED STATES PATENT OFFICE.

JANE GRACE RECORD, OF KOKOMO, INDIANA.

COOKING OVEN.

Application filed July 10, 1926. Serial No. 121,609.

This invention relates to an oven for use in roasting, boiling or baking foods, one of the objects being to provide a structure of this character utilizing a supporting ring adapted to be placed about the burner of a gas stove and on which is mounted an invertible container with which can be combined a hot plate.

Another object is to provide a structure of this character which is simple and durable in construction and is very efficient when used for any of the purposes mentioned.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a plan view of the device set up for use as a roadster or baker, portions being broken away.

Figure 2 is a central vertical section through a portion of the device with the parts assembled as in Figure 1.

Figure 3 is a similar view showing the parts assembled for use as a boiler.

Referring to the figures by characters of reference 1 designates a ring preferably formed of iron provided with one or more radial ears 2 whereby it can be manipulated readily. This ring has a rib 3 extending upwardly and spaced from the inner and outer faces of the ring so as to provide an outer annular seat 4 and an inner annular seat 5.

An invertible housing 6 is used in connection with the ring and in the structure illustrated is cylindrical, this housing having one or more ears 7 extending radially therefrom whereby it can be easily manipulated. One end of the housing is open while the other end is provided with an integral closure 8 arranged back from the edge of the housing. Thus when the housing is positioned with the closed end 8 lowermost, the lower edge of the housing, indicated at 9, will be seated in the annular groove 4 while the closed end 8 will rest upon or be supported close to the rib 3. With the housing thus arranged a lid 10 can be used thereon as shown in Figure 3. A hot plate forms a part of the structure and includes thin iron plates 11 and 12 spaced apart by a disk 13 of asbestos, these plates and asbestos disks being superposed one upon the other and being so shaped as to fit snugly at their margins within the groove 5.

When it is desired to use this device for roasting or as a Dutch oven the ring 1 and the housing 6 are arranged as shown in Figure 3 with the tightly fitting cover 10 in position thereon. Thus the utensil containing the food to be roasted can be placed in the housing and the food properly cooked. When it is desired to use the device for slowly boiling, the housing 6 is discarded and the hot plate made up of the parts 11, 12 and 13 is placed on the ring 1 so as to support the utensil containing the food to be boiled. For quick boiling the plate 12 and the asbestos disk 13 are discarded, leaving only the plate 11 in position on the ring 1 for supporting the utensil containing the food. Where the device is used for baking the parts are arranged as shown in Figure 2 with the housing 6 inverted over the plates 11 and 12 and the asbestos disk 13.

It is to be understood that the connection between the parts is such as to allow them to be disconnected readily it being preferred to have them merely rest one upon the other while in use.

What is claimed is:

1. An oven or the like including a ring having inner and outer annular grooves in the top portion thereof, a reversible housing closed at one end for detachable engagement with the ring, said housing adapted to be seated in the outer groove, and a hot plate for removable engagement with the inner groove in the ring, said plate including spaced metal plates and an interposed asbestos disk.

2. An oven or the like including a ring having inner and outer annular grooves, an invertible housing detachably mounted on the ring and having one end closed to constitute the bottom of the housing when in one position, the outer groove constituting a seat for the housing, and a hot plate removably mounted on the ring with its margin in the inner groove, said plate including separable heat conducting plates and an interposed disk of asbestos.

3. An oven or the like including a ring having inner and outer annular grooves, an invertible housing detachably mounted on the ring and having one end closed to constitute the bottom of the housing when in one position, the outer groove constituting a seat for the housing, a hot plate removably mounted on the ring with its margin in the inner groove, said plate including separable heat conducting plates and an interposed disk of asbestos, lugs extending from the ring and housing respectively, and a cover for the housing.

In testimony that I claim the foregoing as my own, I have hereto affixed my signature.

JANE GRACE RECORD.